C. D. MASON.
VULCANIZED RUBBER ARTICLE.
APPLICATION FILED JUNE 18, 1915.
1,183,023.
Patented May 16, 1916.
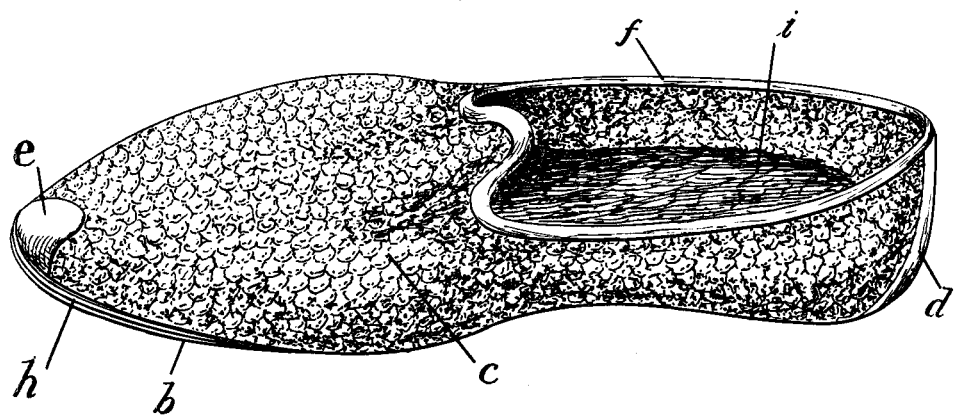
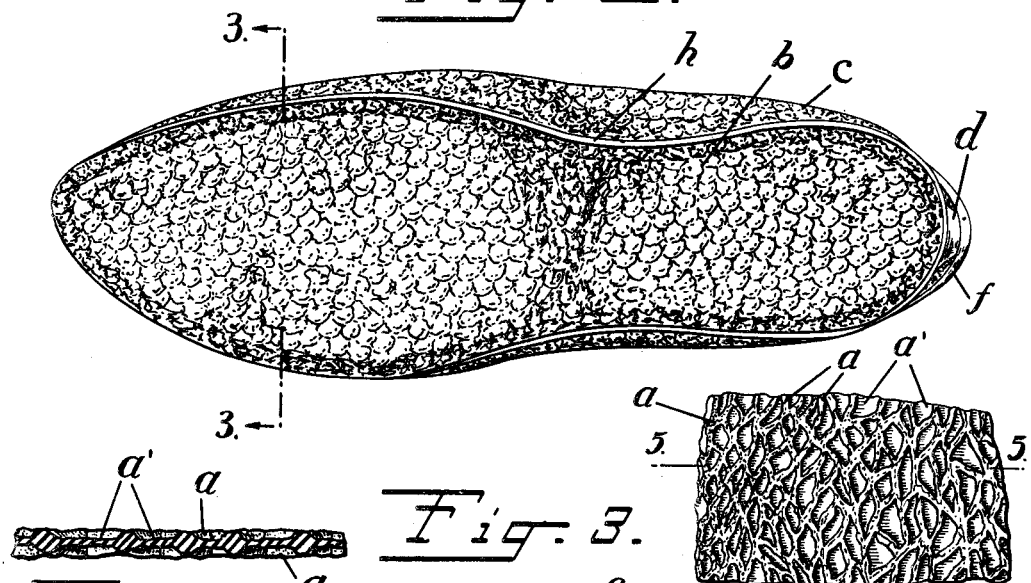
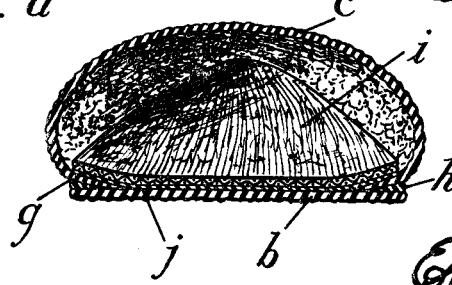
WITNESS:
S. F. Taylor
INVENTOR
Claude D. Mason,
BY
Ernest Hopkinson
HIS ATTORNEY

UNITED STATES PATENT OFFICE.

CLAUDE D. MASON, OF NAUGATUCK, CONNECTICUT, ASSIGNOR TO THE GOODYEAR'S METALLIC RUBBER SHOE CO., A CORPORATION OF CONNECTICUT.

VULCANIZED-RUBBER ARTICLE.

1,183,023.  Specification of Letters Patent.  Patented May 16, 1916.

Application filed June 18, 1915. Serial No. 34,797.

*To all whom it may concern:*

Be it known that I, CLAUDE D. MASON, a citizen of the United States, and a resident of Naugatuck, county of New Haven, and State of Connecticut, have invented certain new and useful Improvements in Vulcanized-Rubber Articles, of which the following is a full, clear, and exact description.

This invention relates to new and useful improvements in articles made in whole or in part of vulcanized rubber, and has for its principal object to provide a vulcanized sheet of rubber or a made up article, wherein the rubber possesses a new formation and new characteristics, better adapting the articles for their intended uses as will be hereinafter more fully described.

While I know of no term that is entirely satisfactory to describe the structure and surface formation of the material comprising this invention with complete accurateness, the characteristics of structure and surface formation may be most nearly described by the word rugose, by which is meant a structure comprising irregularly thick and thin portions and presenting a surface which has a wrinkled, puckered or generally verrucous appearance. This new structural arrangement and surface presents the appearance of an irregular reticulation when stretched, the thick portions being bridged or connected by comparatively thin films or webs of rubber.

From the foregoing description it will be seen that the material while tersely described as composed of a rugose construction and surface appearance, may be further characterized as being composed of an irregular network of vulcanized rubber elements held normally in a puckered, bunched or wrinkled condition by connecting films of vulcanized rubber integrally formed therewith. In its preferred form the sheet is similar on both sides, the connecting films or webs of rubber being located substantially midway of the opposite faces. These films are relatively small in area in their contracted positions, and on casual observation are quite hidden by the wrinkled and larger formations surrounding and overhanging them.

In my preferred method for producing the material comprising this invention, and for which I have filed a copending application for Letters Patent, I first wash and dry the crude rubber in any usual or preferred manner. To give the material the required structural characteristics it is then subjected to a partial breaking-down treatment. This may be accomplished by subjecting the stock to the action of milling rolls, which treatment is discontinued as soon as the stock assumes the desired appearance already described, that is to say, before the rubber breaks down completely or is worked into a complete homogeneous mass. The time consumed for this treatment will vary according to other conditions and therefore cannot be stated with any degree of definiteness. The washing process to which the rubber is usually subjected may be taken advantage of for working the stock into this desired formation. During this treatment it may be made to assume the incomplete or partially homogeneous or broken down condition and reduced to the desired sheeted form and then subjected to the drying process.

To make the material suitable commercially for use in the manufacture of articles it is desirable in many instances that it have incorporated with it a coloring matter, as the original color of rubber would in many cases be entirely unsuitable. A coloring matter is best combined with the stock by first mixing it with a suitable loading material, also to stiffen the stock or to improve it in other respects, or to cheapen its cost it is in some cases desirable to add other ingredients. If it is desired to vulcanize the article by heat, the vulcanizing ingredient, such as sulfur will be added at this mixing operation. The incorporation of these ingredients is preferably obtained by milling the stock on the usual milling rolls, care being taken to maintain the rolls and stock in a substantially cool condition. The stock is then sheeted to the desired gage after which it is built up into any shape or if used in a sheeted form may be cut to the required patterns and built into the various articles of manufacture, the rubber being finally subjected to a vulcanizing treatment, which is preferably effected by the cold cure process. The cold cure process obviates a possibility of the stock becoming so soft under the action of the heat as to lose its characteristics before mentioned.

A piece of my new vulcanized rubber will obviously stretch more freely at its thin portions than at its thicker projections, and it is perhaps this that gives to the material so great an adhesion when an attempt is made to draw it over another surface. By this construction the thin films or webs are protected from abrasive wear by the network of comparatively thick elements that surround them. The wear thus coming upon these comparatively thick elements and the intervening relatively thin webs of rubber adding lightness to the material, combined together, give the material, in addition to the aforesaid anti-slipping property, a wearing property relatively great in comparison to its weight. On account of the irregularity of the surface due to the various sizes of the crinkled formations, the larger ones will be subjected to the initial wear and if these are worn down those smaller in size will still have the gritty anti-slipping surface which is desired, and this surface will continue until the sheeted material is practically worn out. The rubber being only partly broken-down also possesses superior properties on this account, for it is well known that the nerve or life of rubber is detrimentally affected in proportion to the amount of manipulation it undergoes.

On account of the properties already mentioned the material is well adapted for use as massage wash cloths, bath mitts, complexion cloths and the like. Also for use as handles for such articles as fishing rods, motor cycles and the like, where a sure, firm and non-slipping grip is required. The material may also be used in the manufacture of numerous other articles. It is well adapted for articles of footwear such as rubbers, and especially so for bathing slippers where the anti-slipping property is important, and for the further reason that the rough inner surface of the slipper coming in contact with the foot serves to retain the slipper in place, whereas in most articles of this kind precautionary measures are resorted to for holding the slipper on. The material forming the slipper being non-absorbent does not increase in weight which is an advantage over the usual bathing slipper as made from textile fabric when subjected to water.

To further illustrate the advantages of the material but without in any way limiting its use I have shown in the accompanying drawings a bathing slipper made according to my invention, wherein—

Figure 1 is a perspective view of the slipper; Fig. 2 is a perspective view showing principally the bottom portion of the slipper; Fig. 3 is a sectional view on the line 3—3 of Fig. 2, viewed arrow-wise; Fig. 4 is a fragment of the structure of the wall of the slipper in its stretched condition; and Fig. 5 is a section on the line V—V of Fig. 4.

The stock after it has been sheeted is cut or stamped to suitable patterns to form the sole *b* and the upper *c*. The upper is preferably made of one piece joined at the back which may be reinforced by the strip of rubber *d*. A reinforcement *e* at the toe and a binding strip *f* along the top edge made of rubber may also be used when desired, the latter restricting the elasticity about the edge. The upper is secured to the sole along the margin *g* and the filling strip *h* of rubber is inserted at the joint to strengthen the union. In the present embodiment a fibrous insole *i* is used which is preferably rubber-coated over its bottom surface as shown at *j* for securing it to the sole and inturned upper. This reinforces the sole giving it a permanent shape and limits its elasticity. The parts of the slipper are preferably joined together before the stock is vulcanized which may be accomplished by simply pressing the layers of rubber into intimate contact with each other the vulcanization resulting in firmly joining the parts together.

Figs. 4 and 5 give somewhat of an idea of the structure of the vulcanized sheet of rubber when stretched in all directions but on a considerably enlarged scale. It will be observed that the formation somewhat resembles a network-like structure *a*, the interstices being bridged over by comparatively thin films or webs of rubber *a'*. When this sheet is released the rubber recoils until the material assumes an appearance very closely resembling the rugose-like structure already referred to.

Having thus described my invention, what I claim and desire to protect by Letters Patent is:

1. Vulcanized rubber having a partially broken down structure.

2. An article of manufacture comprising vulcanized rubber having a partially broken down structure.

3. Vulcanized rubber having the structural characteristics of partially broken down rubber.

Signed at Naugatuck, Conn., June 16, 1915.

CLAUDE D. MASON.